(12) United States Patent
Trant et al.

(10) Patent No.: US 11,953,210 B2
(45) Date of Patent: *Apr. 9, 2024

(54) WATER HEATER WITH HARDNESS DETECTION SYSTEM

(71) Applicant: Rheem Manufacturing Company, Atlanta, GA (US)

(72) Inventors: Troy Trant, Montgomery, AL (US); Robert D. Brown, Rolla, MO (US); Edward D. Turner, Anniston, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/582,302

(22) Filed: Jan. 24, 2022

(65) Prior Publication Data

US 2022/0221163 A1 Jul. 14, 2022

Related U.S. Application Data

(63) Continuation of application No. 16/226,105, filed on Dec. 19, 2018, now Pat. No. 11,231,182.

(51) Int. Cl.
*F24H 9/00* (2022.01)
*C02F 1/42* (2023.01)
*F24D 17/02* (2006.01)
*F24D 19/00* (2006.01)

(52) U.S. Cl.
CPC ............... *F24D 17/02* (2013.01); *C02F 1/42* (2013.01); *F24D 19/0092* (2013.01); *F24H 9/0042* (2013.01); *C02F 2209/02* (2013.01); *C02F 2209/055* (2013.01); *C02F 2209/40* (2013.01)

(58) Field of Classification Search
CPC .. F28F 19/00; F24D 19/0092; C02F 2209/05; C02F 2209/02; A47L 15/0057; F24H 9/0042
See application file for complete search history.

(56) References Cited

U.S. PATENT DOCUMENTS

| | | | |
|---|---|---|---|
| 4,563,272 A | 1/1986 | Yoshida et al. | |
| 5,152,252 A | 10/1992 | Bolton et al. | |
| 5,843,291 A * | 12/1998 | Eki ...................... | C02F 1/283 |
| | | | 204/263 |
| 5,895,565 A | 4/1999 | Steininger et al. | |
| 9,778,299 B2 | 10/2017 | Davis et al. | |
| 2007/0205160 A1 | 9/2007 | Savage et al. | |

(Continued)

FOREIGN PATENT DOCUMENTS

| | | |
|---|---|---|
| EP | 2169392 A1 | 3/2010 |
| WO | 2019186113 A1 | 10/2019 |

*Primary Examiner* — Eric S Ruppert
(74) *Attorney, Agent, or Firm* — Eversheds Sutherland (US) LLP

(57) ABSTRACT

A tankless water heater including a water inlet, a water outlet, a conductivity sensor, a temperature sensor, and a heating chamber connected to the water inlet and the water outlet wherein the heating chamber is configured to heat a flow of water received from the water inlet and output the flow of water to the water outlet. The water heating system can further include a controller communicably coupled to the conductivity sensor and the temperature sensor, where the controller calculates an adjusted conductivity of a flow of water through the water heater.

20 Claims, 10 Drawing Sheets

(56) References Cited

U.S. PATENT DOCUMENTS

| | | |
|---|---|---|
| 2012/0079995 A1 | 4/2012 | Jaques et al. |
| 2014/0053875 A1 | 2/2014 | Anim-Mensah et al. |
| 2014/0182624 A1 | 7/2014 | Taylor |
| 2018/0186656 A1 | 7/2018 | Drewniak et al. |
| 2019/0112201 A1 | 4/2019 | Branum et al. |

\* cited by examiner

WATER HEATER WITH HARDNESS DETECTION SYSTEM

CROSS REFERENCE TO RELATED APPLICATIONS

The present application is a continuation application of U.S. patent application Ser. No. 16/226,105, filed 19 Dec. 2018, the entire content of which is incorporated herein by reference.

TECHNICAL FIELD

The present disclosure relates generally to water heaters, and more particularly to systems, methods, and devices for inferring the hardness of water flowing in a water heater.

BACKGROUND

Water heaters are generally used to provide a supply of hot water. Water heaters can be used in a number of different residential, commercial, and industrial applications. A water heater can supply hot water to a number of different processes. For example, a hot water heater in a residential dwelling can be used for an automatic clothes washer, an automatic dishwasher, one or more showers, and one or more sink faucets. Water heaters generally input water from a municipal source or from a well. Both of these water sources can include calcium and magnesium carbonates. Water with higher levels of these minerals is considered "hard water." These minerals in water leads to accumulation of mineral scale deposits ("scaling") of the water heater and downstream appliances.

Scale accumulation in tankless water heaters diminishes the performance of the water heater. In order to minimize or diminish scale accumulation, either a water softener is installed in the system or a descaling process needs to be performed.

SUMMARY

A general embodiment of the disclosure is a tankless water heater comprising: a water inlet; a water outlet; a heating chamber connected to the water inlet and the water outlet, wherein the heating chamber is configured to heat a flow of water received from the water inlet and output the flow of water to the water outlet; a conductivity sensor configured to measure an electrical conductivity of the flow of water; a temperature sensor configured to measure a temperature of the flow of water; and a controller comprising processing circuitry, the controller configured to: output a signal to the conductivity sensor; receive conductivity data from the conductivity sensor and temperature data from the temperature sensor, and calculate an adjusted conductivity of the flow of water based on the conductivity data and the temperature data. In some embodiments the conductivity sensor comprises at least a two prong probe, a four prong probe, a six prong probe, or an eight prong probe. In some embodiments, the conductivity sensor and the temperature sensor are integrated into a single housing. In other embodiments, the conductivity sensor and the temperature sensor are located in different housings. In some embodiments, the conductivity sensor and the temperature sensor are installed in the water inlet. The controller can further comprise a transceiver and can be further configured to transmit, via the transceiver, the adjusted conductivity. In some embodiments, the water heater further comprises a display. In some embodiments, the adjusted conductivity of the flow of water is displayed on the display. The controller can be further configured to calculate a time to descale based on the adjusted conductivity, configured to send a descale alert after the time to descale has passed, configured to start an automatic descaling cycle once the time to descale has passed, and/or configured to generate an alert if the adjusted conductivity crosses a predetermined threshold. Calculating the adjusted conductivity of the flow of water can be based on the conductivity data and the temperature data can further comprise averaging the conductivity data. In some embodiments, the controller is configured to store historical conductivity data for the tankless water heater and/or store historical descaling data for the tankless water heater. In some embodiments, a total dissolved solids value is calculated for the flow of water from the adjusted conductivity. The controller can be further configured to receive setup data indicating whether a water softener is connected to the water inlet. The setup data can indicate a water softener is connected and the controller can be configured to send an alert when the adjusted conductivity of the flow of water crosses a predetermined threshold. In some embodiments, an alert indicates an ion exchange material in the water softener is depleted. The controller can be configured to order additional water softener when the adjusted conductivity of the flow of water crosses the predetermined threshold.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
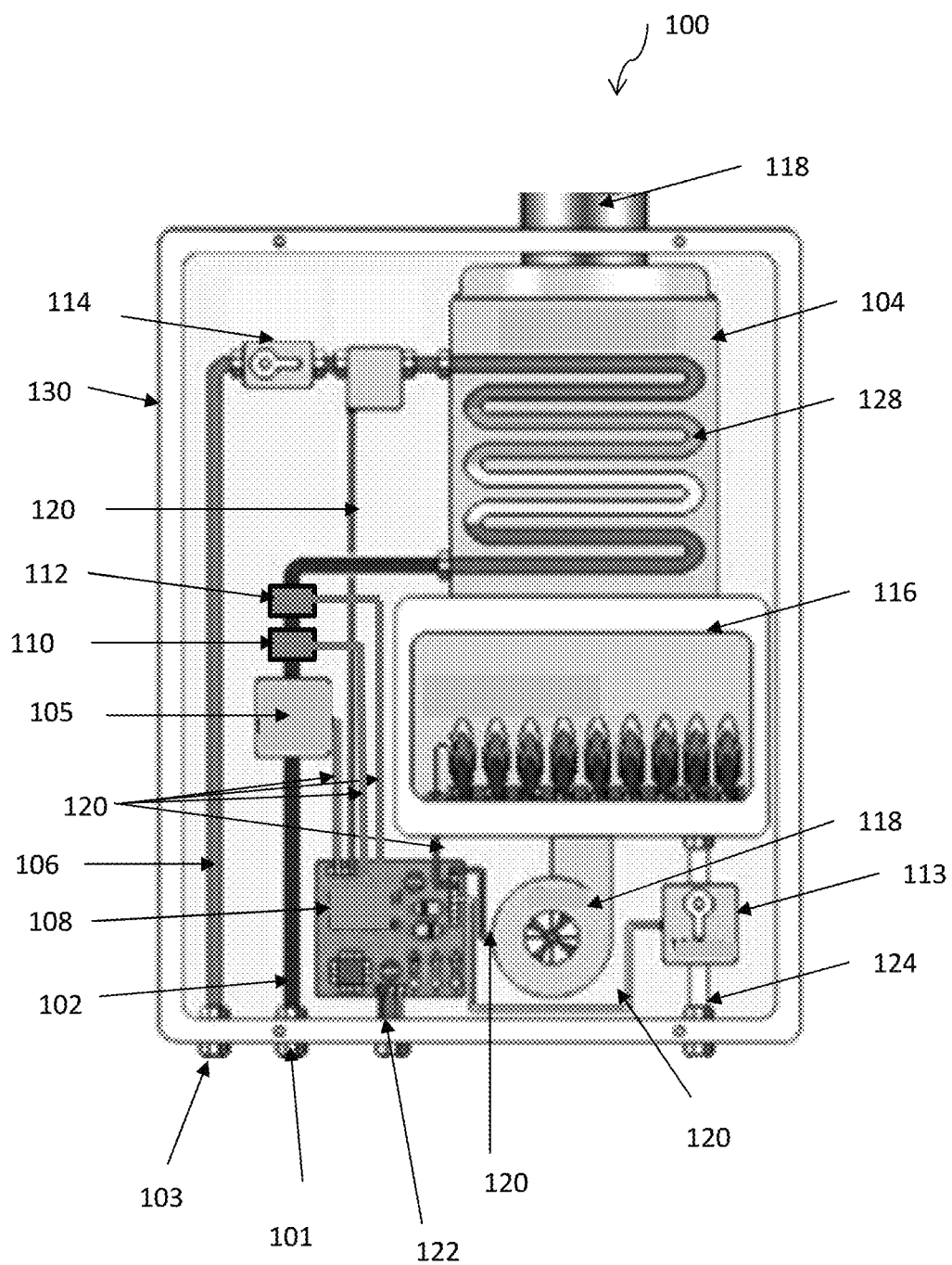
FIG. 1 illustrates an example tankless water heater.

In general, example embodiments provide systems, methods, and devices for measuring the quality of water in a water heater by calculating an adjusted conductivity. The adjusted conductivity calculation can provide an indication of the total dissolved solids ("TDS") in the water, for example. Example embodiments can be used for any size (e.g., capacity) of water heater. Further, example embodiments can be located in any type of environment (e.g., warehouse, attic, garage, storage, mechanical room, basement) for any type (e.g., commercial, residential, industrial) of user. Water heaters used with example embodiments can be used for one or more of any number of processes (e.g., automatic clothes washers, automatic dishwashers, showers, sink faucets, heating systems, humidifiers).

Example embodiments can make a number of determinations with respect to the conductivity of water measured. For instance, example embodiments can determine if the water in the system is considered hard water. As another example, if a water softener is installed in the system embodiments can provide notification when a water softener located upstream of the water heater needs to be refreshed. As yet another example, embodiments can calculate from the water conductivity when a descaling process should be run on the water heater. In some embodiments, if the water adjusted conductivity is high, the tankless water heater system prompts a user to see if a water softener is installed up stream of the tankless water heater. In another embodiment, the conductivity of the water is used to infer the quality of water.

Water heater systems (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a water heater system (or portions thereof) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of water heaters with water conductivity determination, one or more of the components shown may be omitted, repeated, and/or substituted. Accordingly, example embodiments of water heaters with water hardness determination should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In some cases, example embodiments can be subject to meeting certain standards and/or requirements. Examples of entities that set and/or maintain standards include, but are not limited to, the Department of Energy (DOE), the National Electric Code (NEC), the National Electrical Manufacturers Association (NEMA), the International Electrotechnical Commission (IEC), the American Society of Mechanical Engineers (ASME), the National Fire Protection Association (NFPA), the American Society of Heating, Refrigeration and Air Conditioning Engineers (ASHRAE), Underwriters' Laboratories (UL), and the Institute of Electrical and Electronics Engineers (IEEE). Use of example embodiments described herein meet (and/or allow a corresponding water heater system or portion thereof to meet) such standards when required.

Example embodiments of water heaters with adjusted conductivity determination will be described more fully hereinafter with reference to the accompanying drawings, in which example embodiments of water heaters with conductivity determination are shown. Water heaters with conductivity determination may, however, be embodied in many different forms and should not be construed as limited to the example embodiments set forth herein. Rather, these example embodiments are provided so that this disclosure will be thorough and complete, and will fully convey the scope of water heaters with hard water determination to those of ordinary skill in the art. Like, but not necessarily the same, elements (also sometimes called components) in the various figures are denoted by like reference numerals for consistency.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of water heaters with conductivity determination. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the disclosure are drawn to a conductivity sensor and a temperature sensor that are installed internally in a tankless water heater. Because conductivity varies with change in temperature, the measurements of the conductivity sensor and temperature sensor are used to calculate the adjusted conductivity of the water flowing through the tankless water heater. These measurements can be used in a variety of ways. First, the adjusted conductivity measurement can be used to infer the hardness of water so an informed decision can be made about water treatment before scale can form and impede or damage an appliance. The conductivity measurements can also be used to calculate the amount of time needed between descaling processes. In a tankless water heater where a water softener is installed upstream, the conductivity measurement can be used to determine when the water softener ion exchange material (i.e. salt) is depleted. In another embodiment, in a tankless water heater where a mineral removal appliance is installed upstream, the conductivity measurement can be used to determine when the water treatment appliance needs maintenance. In another embodiment, the conductivity measurement can be used to detect unsafe levels of total dissolved solids (TDS), thereby inferring the quality of the water supply.

FIG. 1 illustrates an example tankless water heater 100. The tankless water heater includes an inlet fitting 101 connected to a water inlet 102 which typically receives unheated water from a municipal water source or a well. Water flows through the water inlet 102 and into the heater exchanger 104 which uses a power source, such as electricity or gas (shown), to generate heat which is then exchanged with the water, thereby heating the water. The heat in the heat exchanger 104 can be generated through electricity or gas. The heated water flows out of the tankless water heater 100 through a water outlet 106 and an outlet fitting 103 which can be connected to hot water pipes. The operation of the tankless water heater 100 is controlled by a controller 108. In this embodiment, a conductivity sensor 110 and a temperature sensor 112 are installed in the water inlet 102; however, these sensors can be installed at any point within the tankless water heater 100. The temperature sensor 112 can be any type of temperature sensor and in some embodiments is a thermistor. A flow sensor 105 may also installed in the water inlet 102. The tankless water heater 100 may also comprise valves 114 that are used in the normal operation of a tankless water heater.

Also included in the tankless water heater 100 are an ignitor 116 (also sometimes called a burner 116), an air moving device 118, and a vent 118. One or more of the components of the tankless water heater 100 can be controlled by the controller 108. The ignitor 116 of the tankless water heater 100 can be a flame or other source of heat that is ignited or otherwise initiated (i.e. electrical) when a demand for heated water is detected.

The tankless water heater 100 can include multiple signal and/or power transfer links 120. Signal and/or power transfer links can be delivered to the water heater 100 by a conduit 122, and a fuel (e.g., natural gas, propane) can be delivered to the ignitor 116 through a valve 113 using a pipe 124. The single and/or power transfer links can also be used to transfer signals and/or power between the tankless water heater 100 components. For example, between the controller 108 and the conductivity sensor 110; between the controller 108 and the temperature sensor 112; between the controller 108 and the flow sensor 105; between the controller 108 and valves 113 and 114; between the controller 108 and the air moving device 118; and between the controller 108 and the igniter 116.

An electrical current can be sent from the controller 108 to the conductivity sensor 110 through a signal and/or power transfer link 120. An output signal is sent from the conductivity sensor 110 to the controller 108 through a signal and/or power transfer link 120. An output signal is sent from the temperature sensor 112 to the controller 108. In this way, the controller 108 receives conductivity data from the conductivity sensor 110 and temperature data from the temperature sensor 112. As discussed below with relation to FIG. 2, the conductivity sensor 110 and temperature sensor 112 can be combined into a single sensor apparatus.

The conductivity sensor 110 and the temperature sensor 112 can use one or more of a number of communication protocols. The conductivity sensor 110 can be a stand-alone device or integrated with another component (e.g., with temperature sensor 112) in the tankless water heater 100. The conductivity sensor 110, the temperature sensor 112, and/or a combined sensor can measure a parameter continuously, periodically, based on the occurrence of an event, based on a command received from a control module of the controller 108, and/or based on some other factor. The output of the conductivity sensor 110 and/or the temperature sensor 112 can be either analog or digital. The reference (input) signals can be a sine wave, square wave or a discharging capacitor, as examples. An alternating current source can be used as the input of the conductivity sensor 110. The use of induction can be used to measure water conductivity as well. The communication with the combined device can be as simple as reading an analog signal or utilizing serial communications. Temperature compensation, using the temperature data, of the electrical conductivity signal is performed as the conductance of water and other fluids are temperature dependent. The conductivity sensor 110 and the temperature sensor 112 can be installed within the water heater compartment 130.

The air moving device 118 can be used to direct the heat generated by the ignitor 116 toward the heat exchanger 104. The air moving device 118 can be a fan, a blower, and/or any other device that can force the heat generated by the ignitor 116 toward the heat exchanger 104. The air moving device 118 can be controlled automatically or by the controller 108.

A heat exchanger coil 128 is filled with water that is circulated therethrough. One end of the coil 128 is coupled to the water inlet 102, thereby receiving unheated water. As the water circulates through the coil 128, it continues to absorb the heat absorbed from the ignitor 116 by the coil 128. The water in the coil 128 can be circulated using a pump, gravity, pressure differentials, and/or any other method for circulating water. When the water reaches the other end of the coil 128 of the heat exchanger 104, the water has absorbed enough heat to become heated water. The other end of the coil 128 of the heat exchanger 104 is coupled to the water outlet 106, which can deliver the heated water to a pipe connected to the outlet fitting 103.

The water inlet 102 can be a pipe or other vessel that can allow for the flow of usually unheated water into the heat exchanger 104 of the tankless water heater 100. The water inlet 102 has a distal end that can be disposed at any point within the tankless water heater 100. Similarly, the water outlet 106 can be a pipe or other vessel that can allow for the heated water in the heat exchanger 104 to flow out of the tankless water heater 100. The water outlet 106 has a distal end that can be on the output of the heat exchanger 104. The water outlet 110 has a proximal end attached to the outlet fitting 103 for delivering heated water to one or more of a number of devices (e.g., clothes washer, dishwasher, faucets, shower heads).

Those of ordinary skill in the art will appreciate that a tankless water heater can have any of a number of other configurations. In any case, the controller 108 can be aware of the devices, components, ratings, positioning, and any other relevant information regarding the tankless water heater 100. In some cases, one or more devices of the tankless water heater 100 can have its own local controller, for example in a combined conductivity and temperature sensor. In such a case, the controller 108 can communicate with the local controller using additional signal transfer links. The tankless water heater 100 can also include a number of other components generally considered part of the appliance system which are not shown for conciseness.

Figure 2:
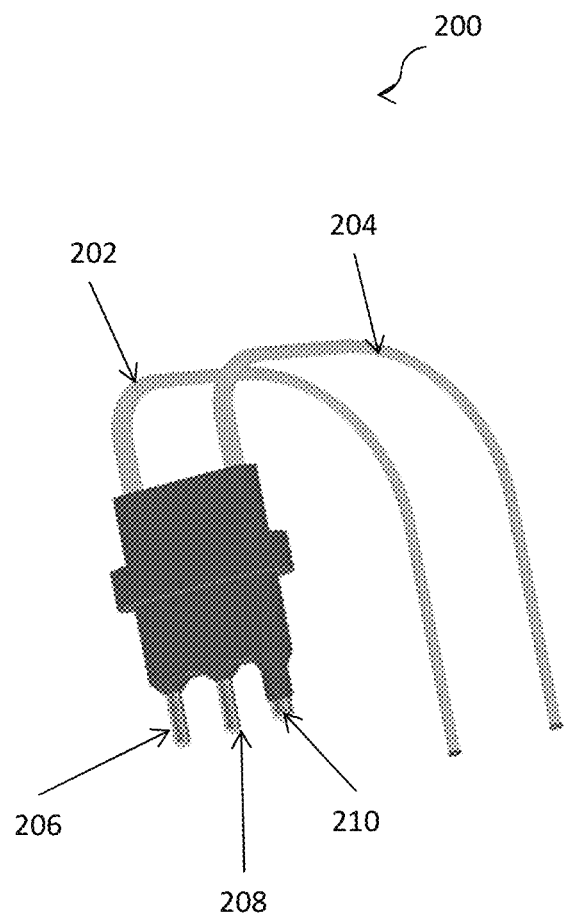
FIG. 2 illustrates an embodiment of a combined conductivity sensor and temperature sensor.

The temperature sensor 112, such as a thermistor, and the conductivity sensor 110 could be installed as a combined sensor. FIG. 2 is an example of a combined sensor 200 that could be used in embodiments of the disclosure. The combined sensor 200 measures the ability of a solution to conduct an electric current between two electrodes in order to measure conductance of a liquid while also measuring temperature. A sensor input 202 and a sensor output 204 are connected to the combined sensor 200 An electrical current provided by a controller flows between a first probe 206, through the flow of water being measured, and to a second probe 208, where the first probe 206 and second probe 208 are a set distance apart. In an embodiment, an AC source is output on one probe and read by the other probe. The voltage drop across the submerged probes determines the resistance of the water, and conductance is the reciprocal of resistance. If there is a high concertation of ions in the solution, the conductance is high. A thermistor probe 210 measures the temperature. The data from the thermistor probe 210 can be used for multiple purposes. The temperature data from the thermistor probe 210 can be used with data from the conductivity probes 206 and 208 in order to determine an adjusted conductivity, which indicates the TDS of the water. TDS can be used as a proxy for the hardness of the water, as the actual harness is typically a measure of the calcium and/or magnesium present—not just the amount of total dissolved solids (TDS). The first probe 206, second probe 208, and thermistor probe 210 can be made of corrosive resistant material. The temperature data from the thermistor probe 210 can also be used to control the operation of the water heater itself.

Some tankless water heaters have thermistors already installed, in which case a conductivity sensor could be installed in proximity to the already installed temperature sensor, as long as the water flowing through both sensors is at the same temperature. In other embodiments, a combined sensor 200, such as the one described in FIG. 2, could be installed in place of a thermistor. In other embodiments, a combined sensor 200 could be installed in a different location within the tankless water heater.

FIGS. 3-6 illustrate alternative embodiments of installation locations for the conductivity sensor and temperature sensor, or a combined sensor. In some embodiments, the conductivity sensor or combined sensor is installed in a tube or a pipe that has low to no inherent conductivity, such as a plastic pipe. In some embodiments, additional thermistors are installed throughout the tankless water heater and are used to control the operation of a tankless water heater.

Figure 3:
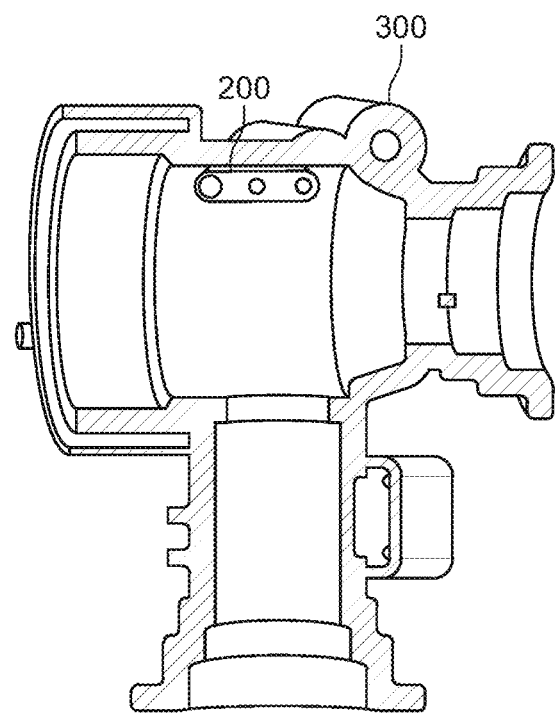
FIG. 3 illustrates a cross section of a combined sensor installed in a tankless water heater inlet housing.
Figure 4:
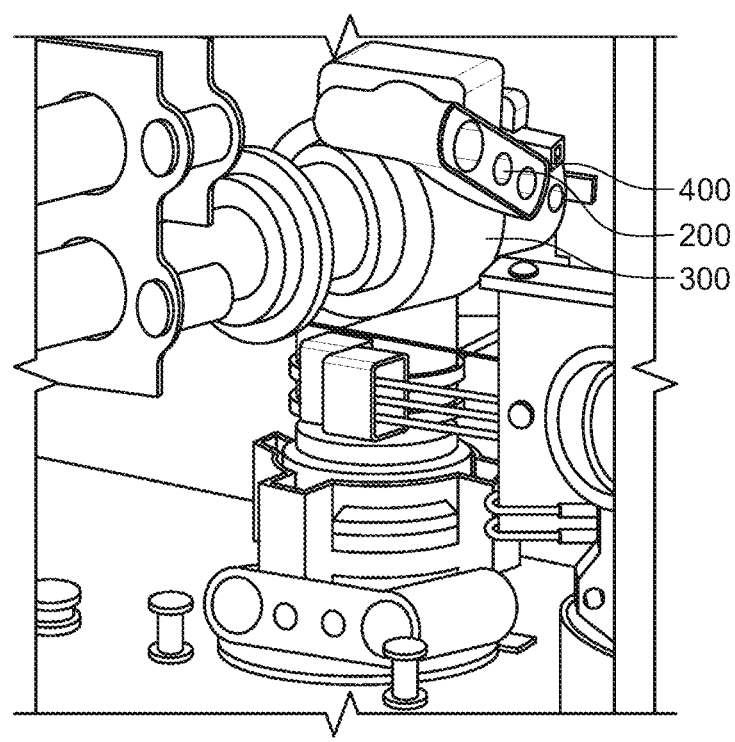
FIG. 4 illustrates the exterior view of the combined sensor and water inlet housing of FIG. 3.

FIG. 3 illustrates a cross section of an inlet housing 300 with a combined sensor 200 installed therein. The inlet housing 300 can be made of a non-conducting polymer and can be located within the water heater near an inlet fitting. FIG. 4 illustrates an exterior view of the inlet housing 300 with the installed combined sensor 200. In this embodiment, no additional o-ring joints are required in the installation of the combined sensor as the combined sensor 200 replaces a single thermistor. Combined sensor 200 input and output wires are bundled and shown as a combined i/o 400. The temperature data received from the combined sensor 200 can be used for multiple control processes. For example, the temperature data received in combination with the conductivity data can be used to calculate an adjusted conductivity of the water flowing through the combined sensor 602.

Figure 5:
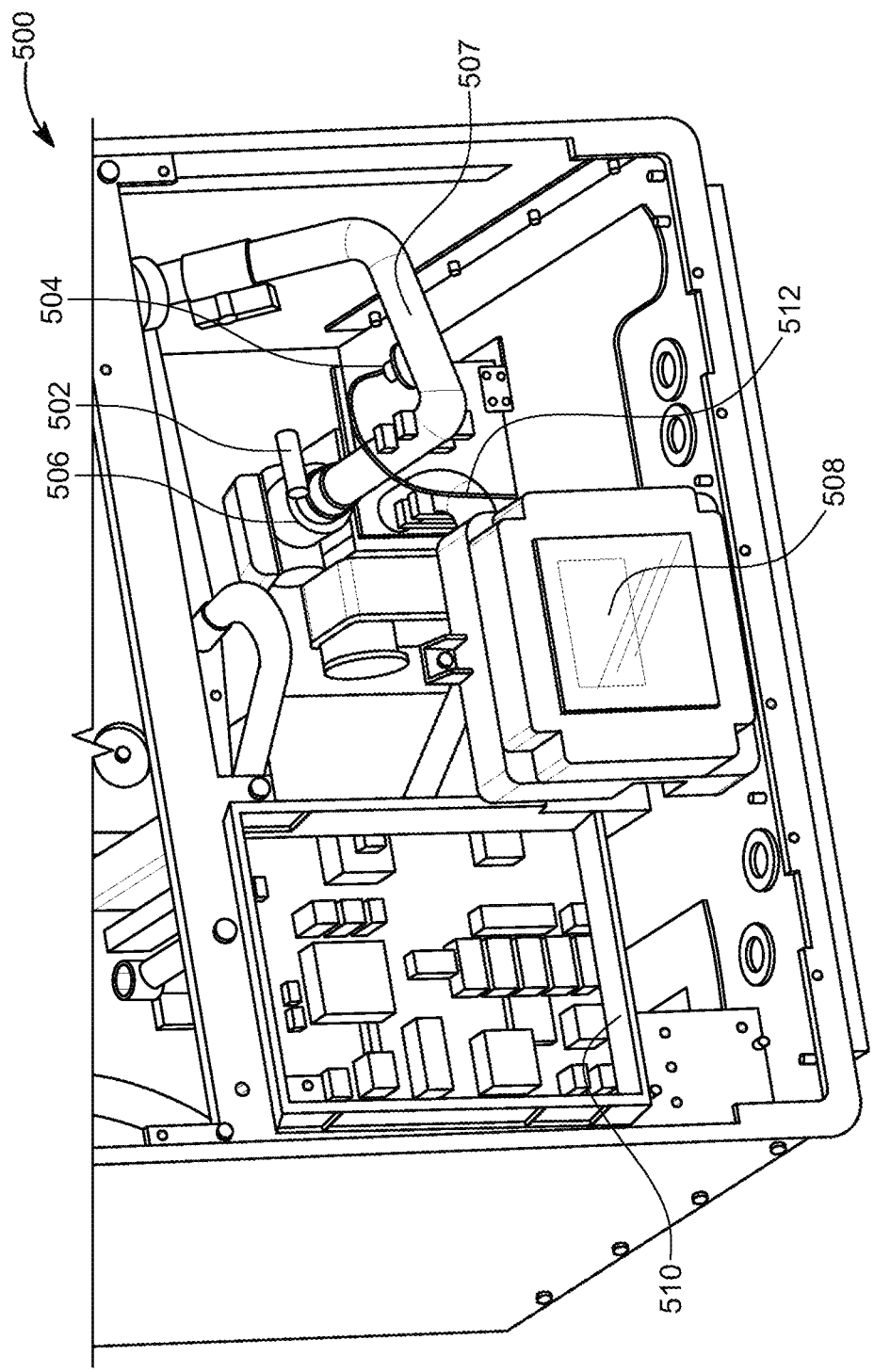
FIG. 5 illustrates the interior of a tankless water heater with a conductivity sensor installed in the water inlet and a thermistor installed in the inlet housing.

FIG. 5 illustrates an embodiment of a tankless water heater 500 which has a thermistor 502 and a conductivity sensor 504 installed in different locations. In this embodiment, the thermistor 502 is installed in the inlet housing 506 of the tankless water heater 500 and the conductivity sensor 504 is installed in the water inlet 507. The tankless water heater 500 additionally comprises a display 508 and a controller 510. Conductivity sensor 504 input and output wires are bundled and shown as a combined i/o 512 coupled to the controller. The controller can receive temperature data from the thermistor 502, which can be used for multiple control processes. For example, the temperature data received in combination with the conductivity data can be used to calculate an adjusted conductivity of the water flowing through the tankless water heater.

Figure 6:
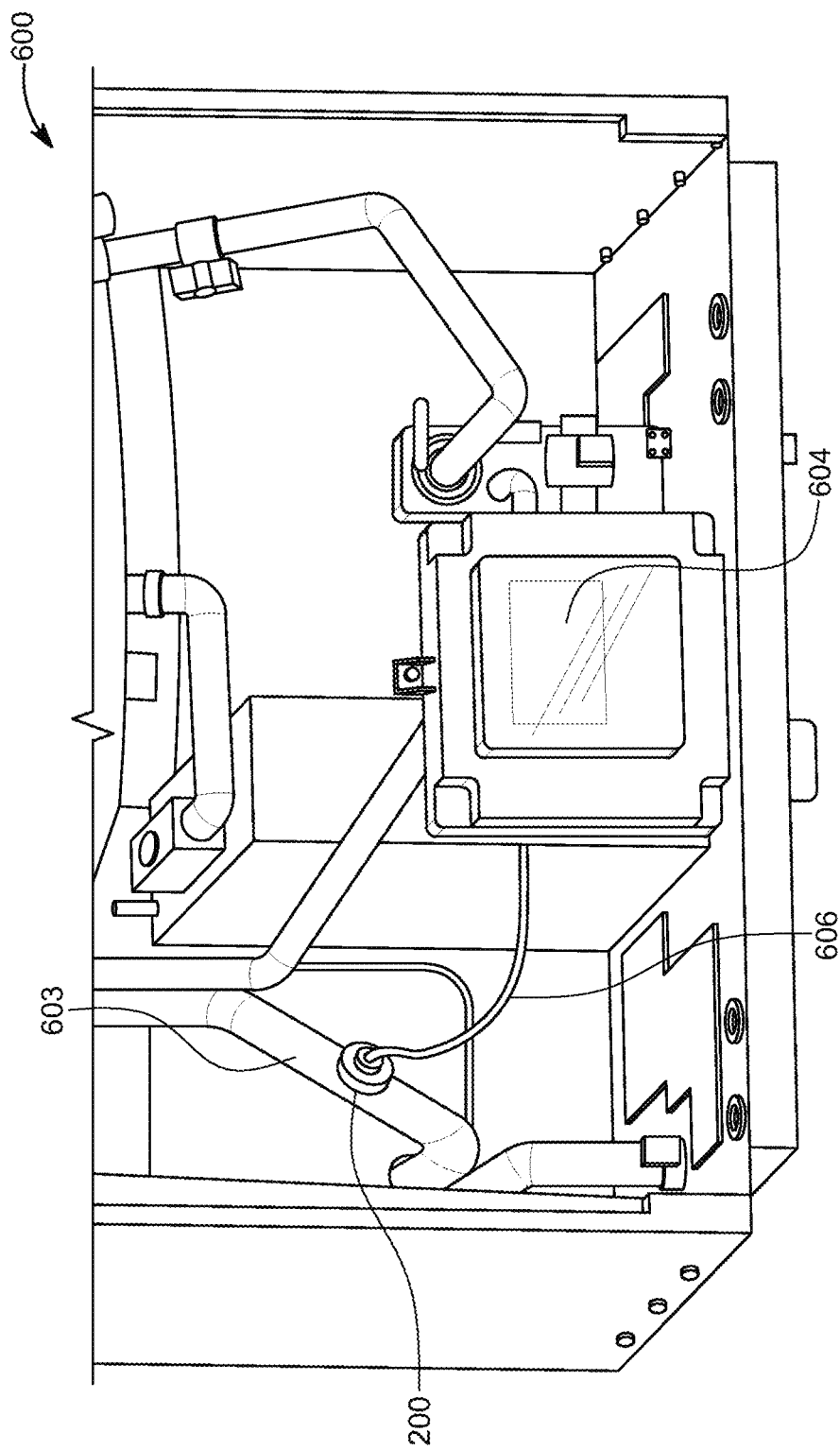
FIG. 6 illustrates the interior of a tankless water heater with a combined conductivity and temperature sensor installed in the water outlet.

FIG. 6 illustrates an embodiment of a tankless water heater 600 with a combined sensor 200 comprising both a conductivity sensor and a temperature sensor installed in the water outlet 603. A display 604 is also installed in this embodiment with the controller located behind the display and not shown. Sensor input and output wires are bundled and shown as a combined i/o 606. The temperature data received from the combined sensor 200 can be used for multiple control processes. For example, the temperature data received can indicate the temperature of hot water received from the coil 128 and can be used to modulate operation of the igniter 116 and/or air moving device 118 when the water reaches a certain temperature. Additionally, the temperature data received in combination with the conductivity data can be used to calculate an adjusted conductivity of the water flowing through the tankless water heater.

Figure 7:
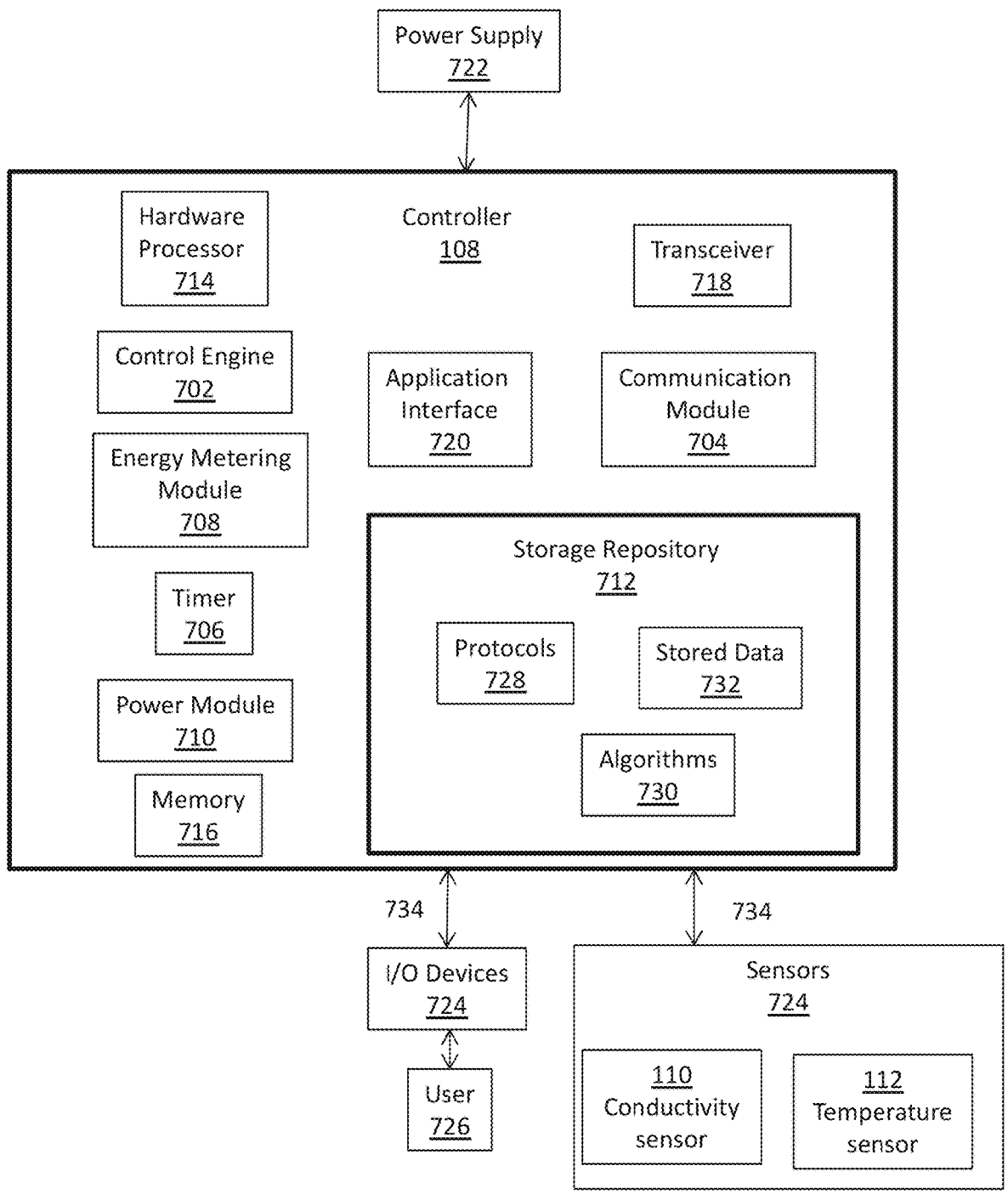
FIG. 7 is a block diagram illustrating an example controller setup.

FIG. 7 is an embodiment of a controller 108 and can include one or more of a number of components. Such components, can include, but are not limited to, a control engine 702, a communication module 704, a timer 706, an energy metering module 708, a power module 710, a storage repository 712, a hardware processor 714, a memory 716, a transceiver 718, and an application interface 720. FIG. 7 also illustrates example connections of the controller to one or more input/output (I/O) devices 724, user 726, some types of sensors 725, and a power supply 722. A bus (not shown) can allow the various components and devices to communicate with one another. A bus can be one or more of any of several types of bus structures, including a memory bus or memory controller, a peripheral bus, an accelerated graphics port, and a processor or local bus using any of a variety of bus architectures. A bus can include wired and/or wireless buses. The components shown in FIG. 7 are not exhaustive, and in some embodiments, one or more of the components shown in FIG. 7 may not be included in an example system. Further, one or more components shown in FIG. 7 can be rearranged. Any component of the example controller can be incorporated into a tankless water heater and can be discrete or combined with one or more other components of a tankless water heater.

A user 726 may be any person or entity that interacts with a tankless water heater and/or the controller 108. Examples of a user 726 may include, but are not limited to, an engineer, an appliance or process that uses heated water, an electrician, an instrumentation and controls technician, a mechanic, an operator, a consultant, a contractor, a homeowner, a landlord, a building management company, and a manufacturer's representative. There can be one or multiple users 726.

The user 726 can use a user system (not shown), which may include a display (e.g., a GUI). The user 726 can interact with (e.g., sends data to, receives data from) the controller 108 via the application interface 720 (described below). The user 726 can also interact with a tankless water heater (including any components thereof, including one or more of the sensor devices) and/or the power supply 722. Interaction between the user 726, the controller 108, the tankless water heater, and the power supply 722 can be conducted using signal transfer links 734.

Each signal transfer link 734 can include wired, as shown in FIG. 1, (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a signal transfer link 734 can be (or include) one or more electrical conductors that are coupled to the controller 108 and to a sensor device 725, such as the conductivity sensor 110 and temperature sensor 112, of the tankless water heater. A signal transfer link 734 can transmit signals (e.g., communication signals, control signals, data) between the controller 108, the user 726, the tankless water heater (including components thereof), and/or the power supply 722.

The power supply 722 provides power to one or more components (e.g., the conductivity sensor 110, the temperature sensor 112, the combined sensor 200, the controller 108, the heat exchanger 104) of a tankless water heater. The power supply 722 can include one or more of a number of single or multiple discrete components (e.g., transistor, diode, resistor), and/or a microprocessor. The power supply 722 may include a printed circuit board, upon which the microprocessor and/or one or more discrete components are positioned.

The power supply 722 can include one or more components (e.g., a transformer, a diode bridge, an inverter, a converter) that receives power (for example, through an electrical cable) from an independent power source external to the heating system 100 and generates power of a type (e.g., AC, DC) and level (e.g., 12V, 24V, 120V) that can be used by one or more components of the heating system 100. In addition, or in the alternative, the power supply 722 can be a source of power in itself. For example, the power supply 722 can be a battery, a localized photovoltaic power system, or some other source of independent power.

The user 726, the power supply 722, and/or sensors, such as the conductivity sensor 110 and the temperature sensor 112 can interact with the controller 108 using the application interface 720 in accordance with one or more example embodiments. Specifically, the application interface 720 of the controller 108 receives data (e.g., information, communications, instructions, updates to firmware) from and sends data (e.g., information, communications, instructions) to the user 726, the power supply 722, and/or other components of a tankless water heater. The user 726, the power supply 722, and other components of a tankless water heater can include an interface to receive data from and send data to the controller 108 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 108, the user 726, the power supply 722, and/or other components of a tankless water heater can use their own system or share a system in certain example embodiments. Such a system can be, or contain a form of, an Internet-based or an intranet-based computer system that is capable of communicating with various software. A computer system includes any type of computing device and/or communication device, including but not limited to the controller 108. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Further, as discussed above, such a system can have corresponding software (e.g., user software, sensor device software). The software of one system can be a part of, or operate separately but in conjunction with, the software of another system within a tankless water heater.

The storage repository 712 can be a persistent storage device (or set of devices) that stores software and data used to assist the controller 108 in communicating with the user 726, the power supply 722, and other components of the tankless water heater 100. In one or more example embodiments, the storage repository 712 stores one or more protocols 728, algorithms 730, and stored data 732. The protocols 728 can be any procedures (e.g., a series of method steps) and/or other similar operational procedures that the control engine 702 of the controller 108 follows based on certain conditions at a point in time. The protocols 728 can include any of a number of communication protocols 728 that are used to send and/or receive data between the controller 108 and the user 726, the power supply 722, and the water heater 190. A protocol 728 can be used for wired and/or wireless communication. Examples of a protocol 728 can include, but are not limited to, Modbus, profibus, Ethernet, and fiberoptic.

The algorithms 730 can be any formulas, logic steps, mathematical models, and/or other suitable means of manipulating and/or processing data. One or more algorithms 730 can be used for a particular protocol 728. As discussed above, the controller 108 uses information (e.g., temperature measurements, conductivity measurements) provided by the conductivity sensor 110, temperature sensor 112, or a combined sensor to generate, using one or more protocols 728 and/or one or more algorithms 730, information related to the conductivity, such as the hardness, of water flowing through the hot water heater.

For example, a protocol 728 and/or an algorithm 730 can dictate when a measurement is taken by a conductivity sensor 110 and the temperature sensor 112. As another example, a protocol 728 and/or an algorithm 730 can be used, in conjunction with measurements made by the conductivity sensor 110 and the temperature sensor 112, by the controller 108 to calculate an adjusted conductivity of a flow of water. As yet another example, a protocol 728 and/or an algorithm 730 can be used by the controller 108 to determine, if a water softener is installed upstream of the tankless water heater, when an ion exchange material in the water softener has been depleted. As still another example, a protocol 728 and/or an algorithm 730 can be used by the controller 108 to calculate a time to descale.

Stored data 732 can be any data associated with a tankless water heater (including any components thereof), any measurements taken by conductivity sensor 110, time measured by the timer 706, adjustments to an algorithm 730, threshold values, user preferences, default values, results of previously run or calculated algorithms 730, water system variables such as whether a water softener is installed and/or any other suitable data. Such data can be any type of data, including but not limited to historical data for the water heater (including any components thereof, such as the conductivity sensor 110 and the temperature sensor 112), calculations, adjustments made to calculations based on actual data, and measurements taken by one or more sensor devices. The stored data 732 can be associated with some measurement of time derived, for example, from the timer 706.

Examples of a storage repository 712 can include, but are not limited to, a database (or a number of databases), a file system, a hard drive, flash memory, some other form of solid state data storage, or any suitable combination thereof. The storage repository 712 can be located on multiple physical machines, each storing all or a portion of the protocols 728, the algorithms 730, and/or the stored data 732 according to some example embodiments. Each storage unit or device can be physically located in the same or in a different geographic location.

The storage repository 712 can be operatively connected to the control engine 702. In one or more example embodiments, the control engine 702 includes functionality to communicate with the user 726, the power supply 722, and other components of the tankless water heater 100. More specifically, the control engine 702 sends information to and/or receives information from the storage repository 712 in order to communicate with the user 726, the power supply 722, and other components of the tankless water heater 100. As discussed below, the storage repository 712 can also be operatively connected to the communication module 704 in certain example embodiments.

In certain example embodiments, the control engine 702 of the controller 108 controls the operation of one or more components (e.g., the communication module 704, the timer 706, the transceiver 718) of the controller 108. For example, the control engine 702 can activate the communication module 704 when the communication module 704 is needed to send data received from another component (e.g., the conductivity sensor 110, the temperature sensor 112, and/or the user 726), for example after an alert.

As another example, the control engine 702 can acquire the current time using the timer 706. The timer 706 can enable the controller 108 to control the components within a tankless water heater. As yet another example, the control engine 702 can direct a sensor, such as the conductivity sensor 110, temperature sensor 112, or a combined sensor 200 to measure a parameter (e.g., temperature, flow rate) and send the measurement by reply to the control engine 702. In some cases, the control engine 702 of the controller 108 can control the position (e.g., open, closed, fully open, fully closed, 50% open) of valves within the tankless water heater. In some embodiment, the controller 108 can control the operation of descaling operation within the tankless water heater.

Figure 8:
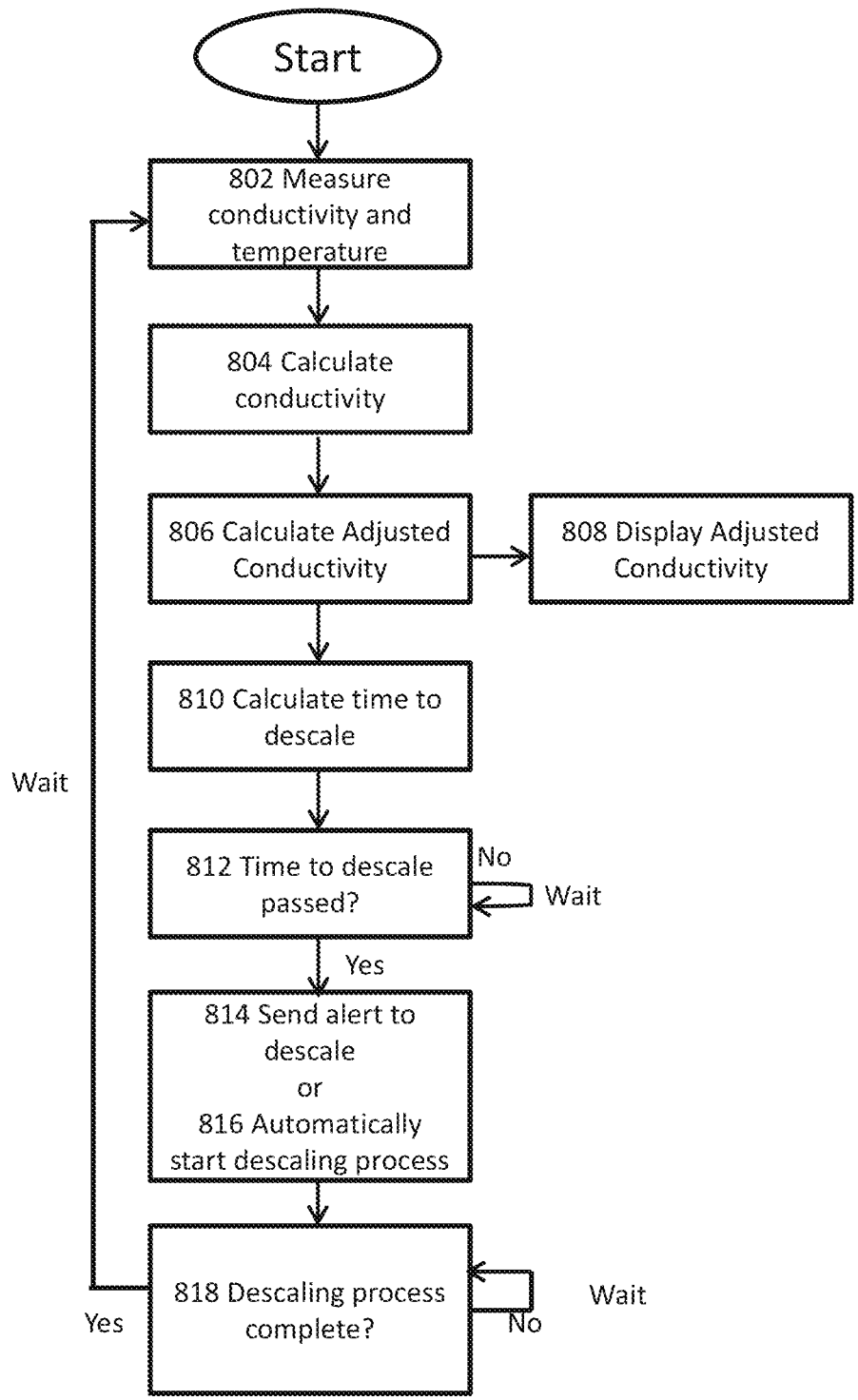
FIG. 8 is an example flow chart for using the conductivity of water to determine the time needed between descaling processes.
Figure 9:
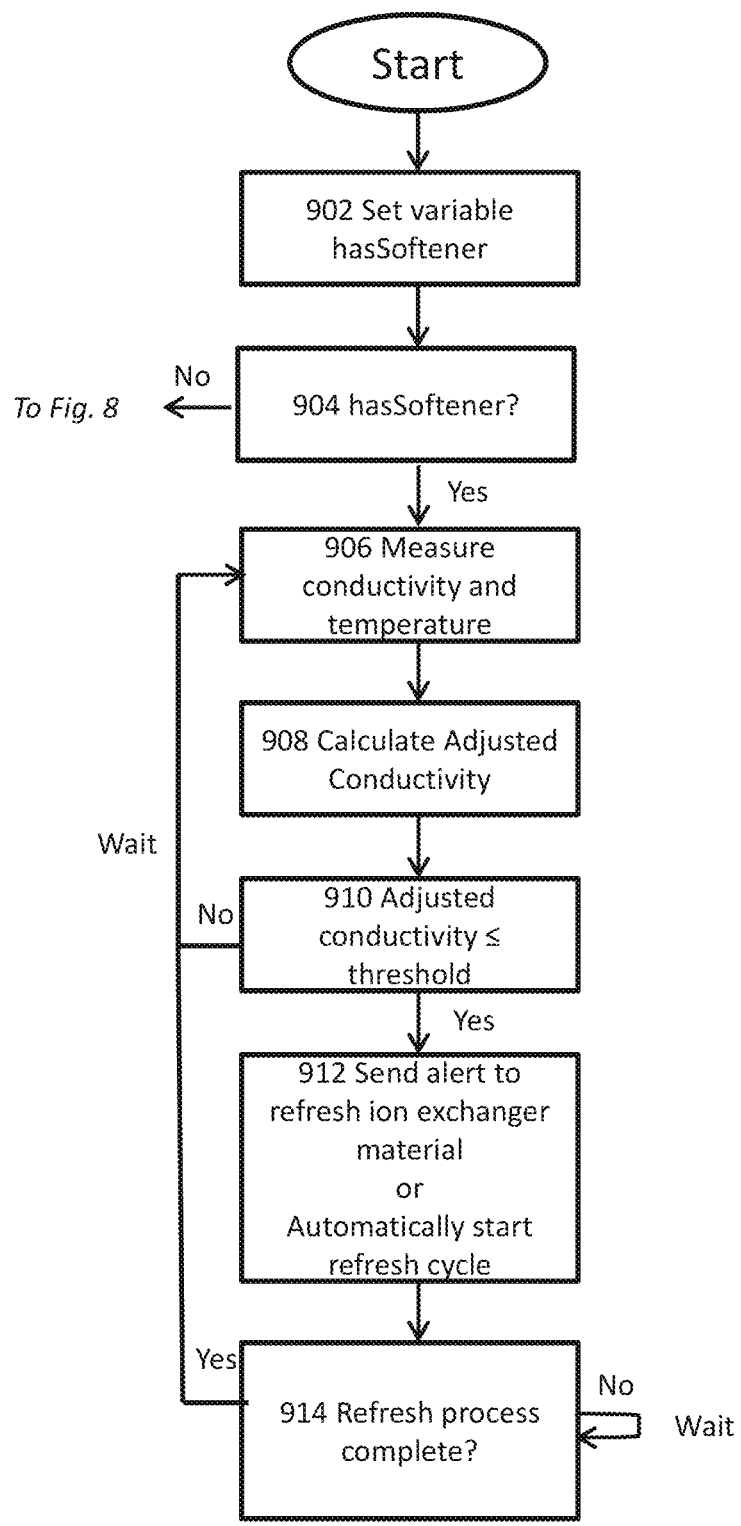
FIG. 9 is an example flow chart for using the conductivity of water to calculate when a water softener installed upstream needs attention.

The control engine 702 can be configured to perform a number of functions that help the control engine 702 make a determination (an estimate) that relates to the hardness of water flowing through the tankless water heater at a particular point in time. For example, the control engine 702 can execute any of the protocols 728 and/or algorithms 730 stored in the storage repository 712 and use the results of those protocols 728 and/or algorithms 730 to communicate to a user 726. As a example, if the water flowing through the tankless water heater 100 has a conductivity over a certain threshold, the control engine 702 can execute other protocols 728 and/or algorithms 730 and use the results of those protocols 728 and/or algorithms 730 to communicate to a user 726 information related to the hardness of the water. In another example, if the water flowing through the tankless water heater has a conductivity under a certain threshold, the control engine 702 can execute other protocols 728 and/or algorithms 730 and use the results of those protocols 728 and/or algorithms 730 to communicate to a user 726 information related to the hardness of the water. FIGS. 8 and 9 below provide more specific examples of how the control engine 702 functions according to certain example embodiments.

The control engine 702 can generate an alarm or some other form of communication when an operating parameter (e.g., information related to hardness of water based on measurements made by the conductivity sensor 110 and temperature sensor 112, or a combined sensor 200) exceeds or falls below a threshold value (in other words, falls outside an acceptable range of values). The control engine 702 can also track measurements made by a conductivity sensor 110 and a temperature sensor 112, or a combined sensor and determine a possible present or future failure of a component of the tankless water heater 190, such as by scale buildup, or of other appliances installed in proximity to the tankless water heater, such as a water softener.

Using one or more algorithms 730, the control engine 702 can predict the expected time before the tankless water heater 100 needs to be descaled based on sensor data, stored data 732, a protocol 728, one or more threshold values, and/or some other factor. The control engine 702 can also measure (using one or more sensors) and analyze the hardness of water which flows through the tankless water heater 100 over time. An alarm can be generated by the control engine 702 when the data from the sensors indicates the hardness of water is above a threshold value, indicating a change in water quality. An alarm can also be generate by the control engine 702 when the amount of time to descale has passed, indicating that a descaling process should be run on the tankless water heater.

The control engine 702 can perform its evaluation functions and resulting actions on a continuous basis, periodically, during certain time intervals, or randomly. Further, the control engine 702 can perform this evaluation for the present time or for a period of time in the future. For example, during the first startup of a tankless water heater, the control engine 702 can determine an adjusted conductivity, such as the TDS, based on sensor data and output the determination to a user. Additionally, if a system variable indicates that the water flowing into the tankless water heater 100 has been softened, the control engine 702 can monitor conductivity data from the conductivity sensor and temperature data from the temperature data and determine an adjusted conductivity of the water. If the adjusted conductivity, such as TDS, falls below a predetermined threshold, the control engine 702 can generate an alarm indicating that the ion exchange material in the water softener needs to be refreshed. The predetermined threshold can be between a 3-15% change in the water conductivity, for example. In a specific embodiment, the predetermined threshold is a difference of between 5-10% of the original water conductivity.

In certain embodiments, the control engine 702 of the controller 108 can communicate with one or more components (e.g., a network manager) of a system external to the tankless water heater 100. For example, the control engine 702 can interact with an inventory management system by ordering a component (e.g., a descaling solution or ion exchange material) to use to descale the tankless water heater that the control engine 702 has determined needs to be descaled or to replace ion exchange material in a water softener. As another example, the control engine 702 can interact with a workforce scheduling system by scheduling a maintenance crew to descale the tankless water heater 100 when the control engine 702 determines that the tankless water heater needs descaling. In this way, the controller 108 is capable of performing a number of functions beyond what could reasonably be considered a routine task.

The power module 710 of the controller 108 provides power to one or more other components (e.g., timer 706, control engine 702) of the controller 108. In addition, in certain example embodiments, the power module 710 can provide power to one or more components (e.g., the heat exchanger 104) of the tankless water heater 100.

The energy metering module 708 of the controller 108 measures one or more components of power (e.g., current, voltage, resistance, VARs, watts) at one or more points (e.g., output of the power supply 722) associated with a tankless water heater. The energy metering module 708 can include any of a number of measuring devices and related devices, including but not limited to a voltmeter, an ammeter, a power meter, an ohmmeter, a current transformer, a potential transformer, and electrical wiring.

The power module 710 can include one or more components (e.g., a transformer, a diode bridge, an inverter, a converter) that receives power (for example, through an electrical cable) from the power supply 722 and generates power of a type (e.g., AC, DC) and level (e.g., 12V, 24V, 120V) that can be used by the other components of the controller 108 and/or by the water heater.

In addition, or in the alternative, the power module 710 can be a source of power in itself to provide signals to the other components of the controller 108. For example, the power module 710 can be a battery. As another example, the power module 710 can be a localized photovoltaic power system. In certain example embodiments, the power module 710 of the controller 108 can also provide power and/or control signals, directly or indirectly, to one or more of the conductivity sensor 110 and the temperature sensor 112, or a combined sensor. In such a case, the control engine 702 can direct the power generated by the power module 710 to one or more of the sensor devices. In this way, power can be conserved by sending power to the sensor devices when those devices need power, as determined by the control engine 702.

The hardware processor 714 of the controller 108 executes software, algorithms 730, and firmware in accordance with one or more example embodiments. Specifically, the hardware processor 714 can execute software on the control engine 702 or any other portion of the controller 108, as well as software used by the user 726, the power supply 722, and the water heater (or portions thereof). The hardware processor 714 can be an integrated circuit, a central processing unit, a multi-core processing chip, SoC, a multi-chip module including multiple multi-core processing chips, or other hardware processor in one or more example embodiments. The hardware processor 714 is known by other names, including but not limited to a computer processor, a microprocessor, and a multi-core processor.

In one or more example embodiments, the hardware processor 714 executes software instructions stored in memory 716. The memory 716 includes one or more cache memories, main memory, and/or any other suitable type of memory. The memory 716 can include volatile and/or non-volatile memory. The memory 716 is discretely located within the controller 108 relative to the hardware processor 714 according to some example embodiments. In certain configurations, the memory 716 can be integrated with the hardware processor 714.

In certain example embodiments, the controller 108 does not include a hardware processor 714. In such a case, the controller 108 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 108 (or portions thereof) to be programmable and function according to certain logic rules and thresholds without the use of a hardware processor. Alternatively, FPGAs, IGBTs, ICs, and/or similar devices can be used in conjunction with one or more hardware processors 714.

The transceiver 718 of the controller 108 can send and/or receive control and/or communication signals. Specifically, the transceiver 718 can be used to transfer data between the controller 108 and the user 726, the power supply 722, and a tankless water heater (or portions thereof). The transceiver 718 can use wired and/or wireless technology.

Memory 716 represents one or more computer storage media. Memory 716 includes volatile media (such as random access memory (RAM)) and/or nonvolatile media (such as read only memory (ROM), flash memory, optical disks, magnetic disks, and so forth). Memory 716 includes fixed media (e.g., RAM, ROM, a fixed hard drive, etc.) as well as removable media (e.g., a flash memory drive, a removable hard drive, an optical disk, and so forth).

One or more I/O devices 724 allow a customer, utility, or other user to enter commands and information to a tankless water heater, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a display, a monitor, or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

FIGS. 8 and 9 each show a flowchart for certain example embodiments. While the various steps in these flowcharts are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. In addition, a person of ordinary skill in the art will appreciate that additional steps not shown in FIGS. 8 and 9 can be included in performing these methods in certain example embodiments.

Accordingly, the specific arrangement of steps should not be construed as limiting the scope. In addition, a particular computing device, as described, for example, in FIG. 7 above, is used to perform one or more of the steps for the methods described below in certain example embodiments. For the methods described below, unless specifically stated otherwise, a description of the controller 108 performing certain functions can be applied to the control engine 702 of the controller 108.

An example method of FIG. 8 begins at the START step. The start step could implemented in the initial startup of the tankless water heater, for example. The method then proceeds to step 802, where the conductivity and temperature of a flow of water are measured, for example by the conductivity sensor 110 and the temperature sensor 112, or a combined sensor 200. Measuring the conductivity can include sending a signal from the controller 108 to the conductivity sensor 110 or to the combined sensor 200. A potential difference can be applied to the first probe and the second probe and the resulting current is proportional to the conductivity of the solution (e.g. flow of water). The current can then be converted into a voltage. These signals can include alternating currents. The results of the measurement are sent back to the controller as conductivity data and temperature data. In another embodiment, the resistance of the water is measured using the measured time constant of a capacitor that is in series with the probes.

Once the controller 108 receives the conductivity data and temperature data, the controller 108 calculates the conductivity in step 804. Calculation of the conductivity is based at least in part on the conductivity data and the temperature data. The following example algorithm 730 (equations) can be used by the controller 108 to calculate the conductivity and can be stored in the storage repository 712:

$$C = G \cdot d/A$$

where G is conductance, d is the distance between the two probes and A is the area of the probe surface. A and d are constant for each specific probe. Temperature correction can also be applied for a temperature corrected electrical conductivity unit ($EC_{25}$). For example:

$$EC_{25} = EC/[1 + a(t-25)] \text{ where } a = 0.020 \text{ or } 0.019, \text{ for example}$$

In step 806, the controller 108 calculates an adjusted conductivity by modifying the calculated conductivity based on the measured temperature (as above). The adjusted conductivity can also be used to determine the total dissolved solids (TDS) in the water flow. The TDS of the water can be calculated by applying a multiplication factor, usually between 0.5-1.0 depending on the system. In some embodiments, the multiplication factor is between 0.55 and 0.70. For example:

$$TDS(mg/L) = EC \cdot 0.68$$

The conductance, temperature, and/or adjusted conductivity data can be smoothed. For example, the data can be smoothed through time averaging, dropping extreme short duration values (for example values that differ greater than 10% from the average), and/or any other appropriate averaging method, such as using a rolling average.

After the adjusted conductivity is calculated, it can be displayed on an I/O device 724 (step 808). Additionally, if the adjusted conductivity is over a certain high adjusted conductivity threshold, the controller 108 could issue an alert. Example very high TDS thresholds are over 180 mg/L. For example, an alert can be text displayed on a display mounted the tankless water heater 100, a specific sound made by the water heater, a text message, an application notification, a light indicator on the tankless water heater, an indication on the user display, an email message, etc. In a specific embodiment, the tankless water heater displays a green light if the adjusted conductivity indicates a low level of hardness in the water supply, a yellow light if the adjusted conductivity indicates a moderate level of hardness in the water supply, or a red light if the adjusted conductivity indicates a high level of hardness in the water supply. The adjusted conductivity can also be used to calculate a time to descale (step 810). The following algorithm 730 (equations) can be used by the controller 108 to calculate the time to descale and can be stored in the storage repository. It should be noted that the time to descale will vary depending on the adjusted conductivity of the water and the type of tankless water heater the method is being performed in. The descale operation could be a quick maintance flush requiring little time to a larger descaling process requiring hours. Adjusted conductivity can be calculated as TDS. While exact water hardness cannot be calculated from TDS, TDS is used as a proxy to measure general water hardness, as most of the TDS coming from a drinking water supply comes from ions within the water supply. The mass fraction of calcium and magnesium is typically known in a particular region, so as TDS fluctuates the mass fraction is assumed to stay constant.

A time to descale is calculated based on the adjusted conductivity. The time to descale will depend on the adjusted conductivity of the water. If the adjusted conductivity is relatively high for a water supply to a tankless water heater than the time to descale will be shorter than the time to descale for a tankless water with a supply of low adjusted conductivity. Examples of time to descale could be between 2 weeks and 2 years. For example about 2 weeks, 2 months, 4 months, 6 months, 8 months, 10 months, 12 months, 14 months, 16 months, 18 months, 20 months, 22 months, or 24 months.

After the calculated time to descale has passed (step 812) as measured by the timer 706, an alert can be sent to descale the system (step 814) or the system can automatically start a descaling process (step 816). If an automatic descaling process is started, then an alert can be sent with a notification that the descaling process is starting. An alert, for example, is any type of notification that a user could receive that notifies the user of a specific state of the appliance. For example, an alert can be text displayed on a display mounted on the tankless water heater, a specific sound made by the water heater, a text message, an application notification, a light indicator on the tankless water heater, etc. Step 818 monitors for the completion of the descaling process. For example, the controller 108 could wait for input from a user to indicate a descaling process has been completed, or the conductivity and temperature could be measured until the adjusted conductivity indicates that the descaling process is complete. For example, such an indication of a completed descaling process may appear as the conductivity leveling out during a descaling process, indicating that the scale has been removed. That is, the conductivity of the fluid would increase until the removal of pipe scale into the fluid ceases. This indicates that either the fluid is saturated and another cycle should be initiated with fresh cleaning fluid or that there is no more scale available in the pipes/system to dissolve into the cleaning fluid. After the descaling process is complete, the system returns to step 802 and starts the process over.

In another embodiment shown in FIG. 9, the method begins at the START step. At the initial setup of a tankless water heater, a user sets a variable, such as hasSoftener, to indicate if a water softener is installed upstream of the tankless water heater (step 902). The variable is checked (step 904) and if a water softener is not installed the process of FIG. 8 is entered. If a water softener is installed, than a tankless water heater 100 does not need to be descaled. However, the hardness of the water can be monitored for the efficacy of the water softener and alert a user to when the water softener needs attention. Step 906 is entered when a water softener is installed upstream. In step 906, the conductivity and temperature are measured, for example by the conductivity sensor 110 and the temperature sensor 112, or a combined sensor 200. Measuring the conductivity can include sending a signal from the controller 108 to the conductivity sensor 110 or to the combined sensor 200. The results of the measurement are sent back to the controller as conductivity data and temperature data.

Once the controller 108 receives the conductivity data and temperature data, the controller 108 calculates the adjusted conductivity in step 908. Calculation of the adjusted conductivity is based at least in part on the conductivity data and the temperature data. The example algorithm 730 (equations) can be used by the controller 108 in FIG. 8 can also be used in this method to calculate the adjusted conductivity and can be stored in the storage repository 712. Note that in some embodiments, step 902 could occur after step 908. In this alternative embodiment, the variable hasSoftener is defaulted to No at startup and a user is only prompted to set hasSoftener if the adjusted conductivity measurement is over a certain adjusted conductivity threshold to determine if there is a chance a softener has been installed upstream of the tankless water heater, such as over 360 ppm.

The adjusted conductivity is compared to a predetermined threshold in step 910. It should be noted that the predetermined threshold can vary depending on the type of water softener installed. The predetermined threshold can be determined by a calibrating measurement performed during the initial install procedure, and can be modified intervals or when the de-ionizing water softener has been replenished. The calibration can be performed when the upstream softener is filled and functioning properly. As discussed above the predetermined threshold can be between a 5-10% drop in the calculated adjusted conductivity, such as an 7% drop in adjusted conductivity. The predetermined threshold could also be a predetermined set adjusted conductivity. Examples of predetermined set adjusted conductivity thresholds, such as TDS thresholds, are over 60, over 120, or over 180. The threshold value can be part of the stored data 732 of the storage repository 712. The threshold can be set during the initial set up of the water heater or can be a constant variable programmed into the water heater. The threshold value can be some minimum adjusted conductivity at which point the water supplied to the tankless water heater is no longer properly being softened. Alternatively, the threshold value can be a set point differential. If adjusted conductivity is equal to or lower than the threshold value, then the process proceeds to step 912. If the adjusted conductivity measurement is not equal to or below the threshold value, then the water supply is being properly softened and the algorithm 720 waits (pauses). This alarm could be manually reset or the system could continue to take measurements and turn of the alarm when the measurement returns to normal after the softening system has a chance to recharge itself. The wait can be any length of time appropriate for the method. For example, the wait can be between 0.1 seconds and 1 month. For example, the measurement can be taken every 0.1 second, 1 second, 1.25 seconds, 1.5 seconds, 1.75 seconds, 1 minute, 2 minutes, 5 minutes, 10 minutes, 15 minutes, 30 minutes, 1 hour, 2 hours, 3 hours, 4 hours, 8 hours, 12 hours, 16 hours, 20 hours, 1 day, 2 days, 3 days, 4 days, 5 days, 6, days, 1 week, 2 weeks, 3 weeks, 4 weeks, 1 month and any time between. In some embodiments, the wait is the length of time between a water draw. That is, the measurements are taken every time water is drawn. In some embodiments, the wait is the same amount of time, and in some embodiments the wait is a different amount of time each time the loop occurs. Additionally, a high frequency signal can occasionally be transferred to the probes in order to de-polarize the water and/or probe electrodes (not shown).

When the adjusted conductivity passes a threshold, in step 912 an alert is sent that indicates that the water softener needs attention or the controller 108 can automatically start a water softener refresh cycle. An alert, for example, is any type of notification that a user could receive that notifies the user of a specific state of the appliance. For example, an alert can be text displayed on a display mounted on the tankless water heater 100, a specific sound made by the water heater, a text message, an application notification, a light indicator on the tankless water heater, etc. Step 914 monitors for the completion of the refresh cycle. For example, the controller 108 could wait for input from a user to indicate a refresh cycle has been completed, or the conductivity and temperature could be measured until the adjusted conductivity indicates that the water has been softened (through use of a predetermined set or differential threshold). Once the refresh process is complete or a user indicates that the water softener has been attended too, the algorithm loops back to step 806.

Figure 10:
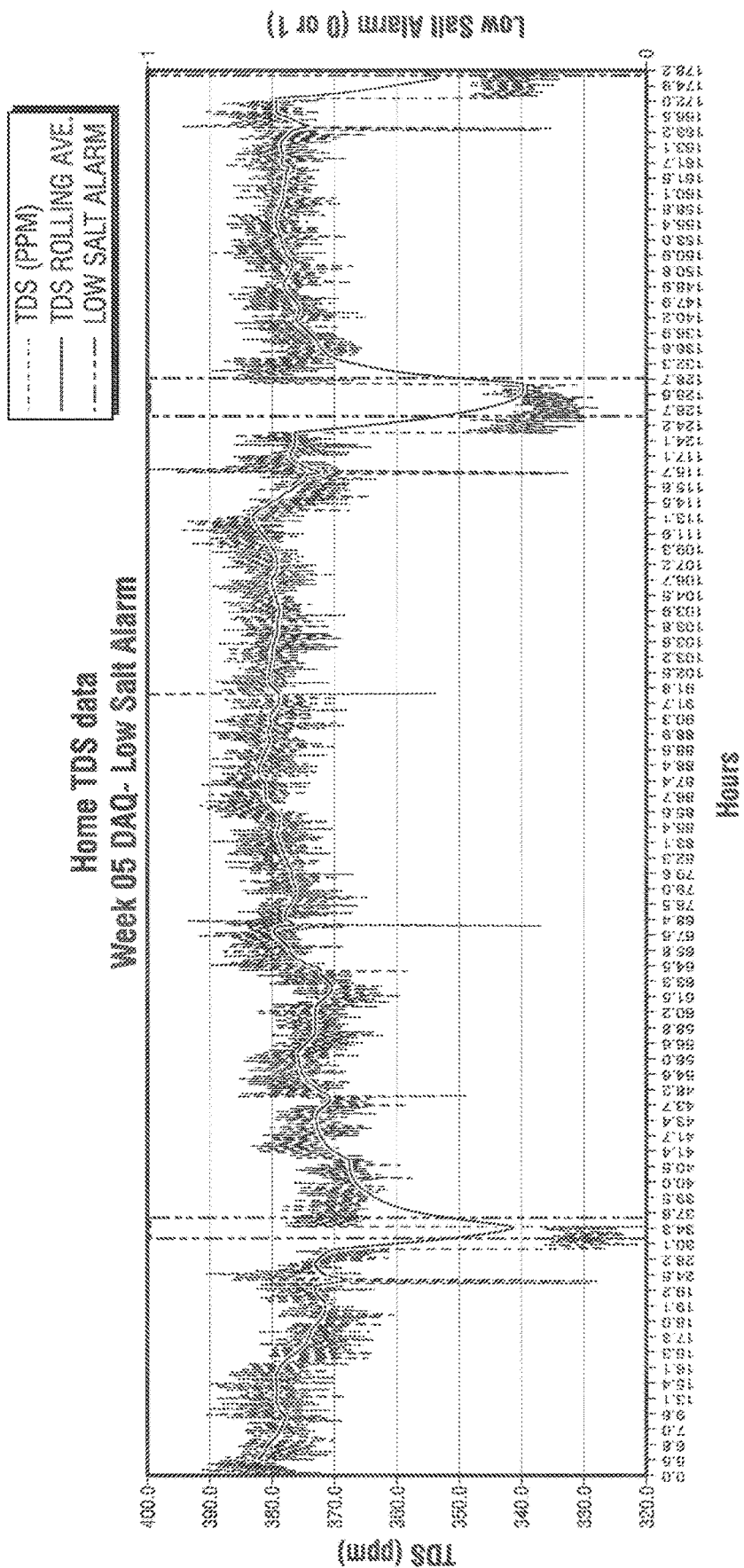
FIG. 10 is a graph of TDS per hour in a home system with an installed water softener. The graph illustrates three water softener bypass events.

FIG. 10 is a graph of an example TDS per hour graph of a water supply which illustrates three artificial water softener bypass events. The noisy signal is raw home TDS data collected downstream of a salt based water softener. The solid line is the output of a smoothing function that took the raw TDS data and eliminates any signal extremes that could trigger a false low salt alarm. The square signal is a binary alarm that triggers when a persistent low TDS value is detected from the output of the smoothing signal.

Figure 11:
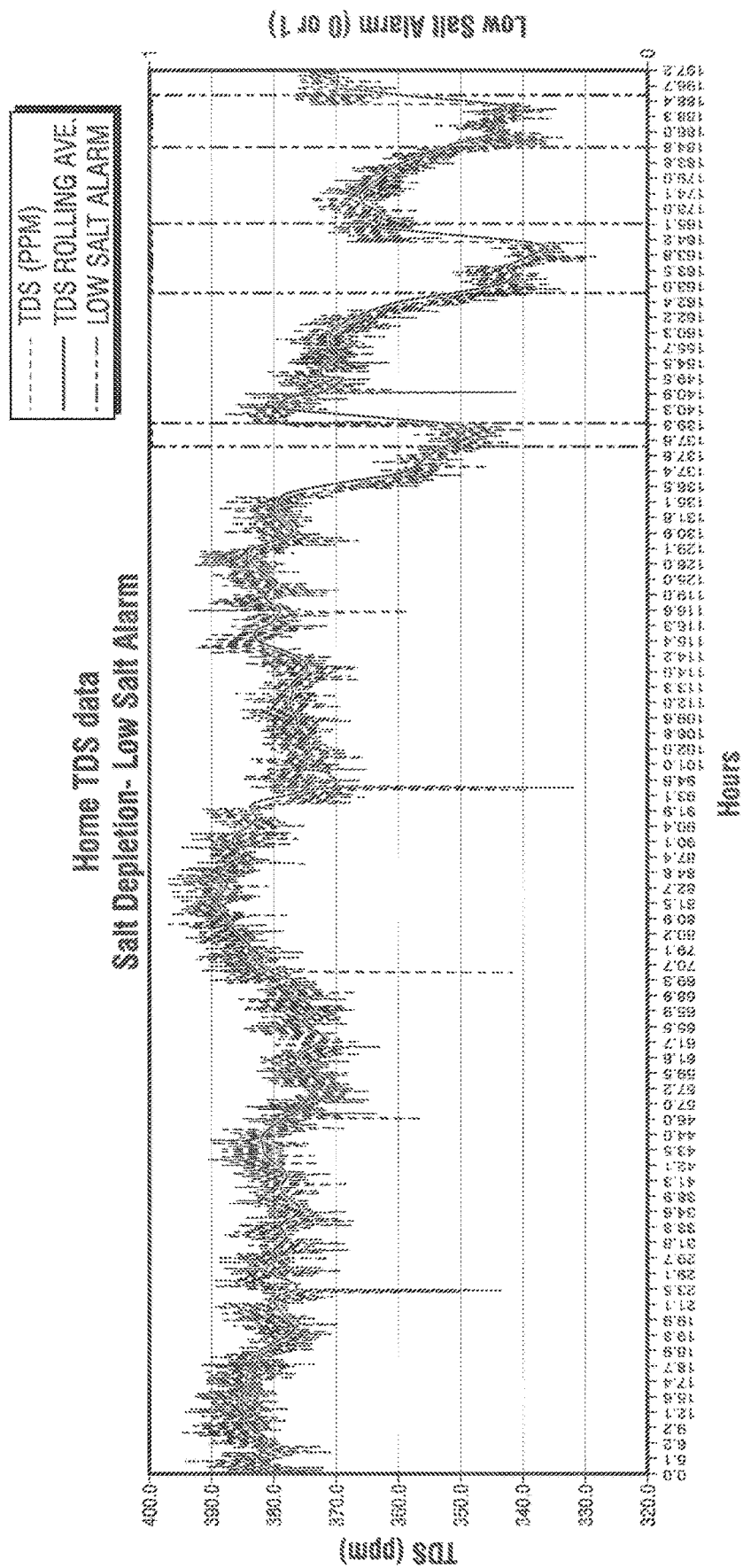
FIG. 11 is a graph of TDS per hour in a home system with an installed water softener. The graph illustrates three naturally occurring instances of ion exchange material depletion. This graph shows how the output TDS level is effected as a NACL water softener runs out of salt. While the recharge cycle is still being attempted by the system, the salt reservoir was never refilled.

FIG. 11 is a graph of an example TDS per hour graph of a water supply which illustrates water softener natural depletion. The noisy signal is raw home TDS data collected downstream of a salt based water softener. The solid line is the output of a smoothing function that took the raw TDS data and eliminates any signal extremes that could trigger a false low salt alarm. The square signal is a binary alarm that triggers when a persistent low TDS value is detected from the output of the smoothing signal.

Using electrical conductivity to indicate the hardness of water with the example methods and system described herein is inexpensive, reliable and robust. Additionally, this method does not require calibration during installation; however, calibration can be done at the manufacturing facility using a standard solution. Including a conductivity sensor in a tankless water heater has the additional benefits of not only indicating the initial hardness of water, but detecting an out of salt condition from an upstream water treatment device, can be used in the determination of a descaling cleaning schedule, and can also determine when the descaling process is complete. The tankless water heater with TDS detection can also measure water quality over time.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A non-transitory, computer-readable medium having instructions stored thereon that, when executed by one or more processors, cause a controller to:
   receive sensor data from one or more sensors of a water heater appliance, the one or more sensors including a conductivity sensor of a water heater appliance and the sensor data including raw conductivity data from the conductivity sensor;
   determine calculated conductivity data based at least in part on the sensor data;
   output instructions for initiating a descaling cycle based at least in part on the calculated conductivity data;
   subsequent to initiation of the descaling cycle, output instructions for terminating the descaling cycle in response to determining that an increase in the calculated conductivity data has stopped.

2. The non-transitory, computer-readable medium of claim 1, wherein the one or more sensors further includes a temperature sensor of the water heater appliance and the sensor data includes temperature data from the temperature sensor.

3. The non-transitory, computer-readable medium of claim 1, wherein determining the calculated conductivity data comprises filtering initial calculated conductivity data.

4. The non-transitory, computer-readable medium of claim 3, wherein filtering the initial calculated conductivity data comprises at least one of time averaging the initial calculated conductivity data, discarding any of the initial calculated conductivity data that differs from an average of the initial calculated conductivity data by greater than a predetermined percentage, or calculating a rolling average of the initial calculated conductivity data.

5. The non-transitory, computer-readable medium of claim 1, wherein the instructions, when executed by one or more processors, further cause the controller to:
   monitor the calculated conductivity data over a period of time;
   calculate a time until descaling based at least in part on the calculated conductivity data; and
   output the instructions for initiating the descaling cycle in response to determining that the time until descaling has elapsed.

6. The non-transitory, computer-readable medium of claim 5, wherein the instructions, when executed by one or more processors, further cause the controller to:
   decrease the time until descaling in response to determining that a value of the calculated conductivity data has increased over time.

7. The non-transitory, computer-readable medium of claim 1, wherein the instructions, when executed by one or more processors, further cause the controller to:
   determine a total dissolved solids (TDS) value based at least in part on the calculated conductivity data, the TDS value being associated with a flow of water through the water heater appliance.

8. The non-transitory, computer-readable medium of claim 7, wherein the instructions, when executed by one or more processors, further cause the controller to:
   output a TDS alert if the TDS value is greater than a TDS threshold.

9. The non-transitory, computer-readable medium of claim 1, wherein the instructions, when executed by one or more processors, further cause the controller to:
   output a descale alert in response to outputting the instructions for initiating the descaling cycle.

10. A water heater comprising:
    a water inlet;
    a water outlet;
    a heating chamber connected to the water inlet and the water outlet, wherein the heating chamber is configured to heat a flow of water received from the water inlet and output the flow of water to the water outlet;
    a conductivity sensor configured to measure an electrical conductivity of the flow of water and output raw conductivity data indicative of the electrical conductivity of the flow of water; and
    a controller configured to:
      receive the raw conductivity data from the conductivity sensor;
      determine calculated conductivity data based at least in part on the raw conductivity data;
      output instructions for initiating a descaling cycle based at least in part on the calculated conductivity data;
      subsequent to initiation of the descaling cycle, output instructions for terminating the descaling cycle in response to determining that an increase in the calculated conductivity data has stopped.

11. The water heater of claim 10 further comprising:
    a temperature sensor configured to measure a temperature of the flow of water and output temperature data indicative of the temperature of the flow of water,
    wherein the controller is further configured to receive the temperature data from the temperature sensor.

12. The water heater of claim 11, wherein the conductivity sensor and the temperature sensor are integrated into a single housing.

13. The water heater of claim 10, wherein determining the calculated conductivity data comprises filtering initial calculated conductivity data.

14. The water heater of claim 11, wherein filtering the initial calculated conductivity data comprises at least one of time averaging the initial calculated conductivity data, discarding any of the initial calculated conductivity data that differs from an average of the initial calculated conductivity data by greater than a predetermined percentage, or calculating a rolling average of the initial calculated conductivity data.

15. The water heater of claim 10, wherein the controller is further configured to:
    monitor the calculated conductivity data over a period of time; and
    calculate a time until descaling based at least in part on the calculated conductivity data, wherein the controller is configured to output the instructions for initiating the descaling cycle in response to determining that the time until descaling has elapsed.

16. The water heater of claim 15, wherein the controller is further configured to:
decrease the time until descaling in response to determining that a value of the calculated conductivity data has increased over time.

17. The water heater of claim 10, wherein the controller is further configured to:
determine a total dissolved solids (TDS) value based at least in part on the calculated conductivity data, the TDS value being associated with a flow of water through the water heater.

18. The water heater of claim 17, wherein the controller is further configured to:
output a TDS alert if the TDS value is greater than a TDS threshold.

19. The water heater of claim 10, wherein the controller is further configured to:
output a descale alert in response to outputting the instructions for initiating the descaling cycle.

20. The water heater of claim 10, wherein the controller is further configured to:
receive setup data indicating a water softener is connected to a water system that includes the water heater; and
output a water softener alert in response to determining the calculated conductivity data is less than a water softener threshold.

* * * * *